United States Patent
Tang

(10) Patent No.: US 10,762,324 B2
(45) Date of Patent: Sep. 1, 2020

(54) PRESSURE DETERMINATION METHOD AND DEVICE AND FINGERPRINT RECOGNITION METHOD AND DEVICE

(71) Applicant: BEIJING XIAOMI MOBILE SOFTWARE CO., LTD., Beijing (CN)

(72) Inventor: Ju Tang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 141 days.

(21) Appl. No.: 16/037,582

(22) Filed: Jul. 17, 2018

(65) Prior Publication Data

US 2019/0026526 A1 Jan. 24, 2019

(30) Foreign Application Priority Data

Jul. 21, 2017 (CN) .......................... 2017 1 0601710

(51) Int. Cl.
*G06K 9/00* (2006.01)
*G06K 9/62* (2006.01)
*G01L 1/24* (2006.01)

(52) U.S. Cl.
CPC ......... *G06K 9/0008* (2013.01); *G06K 9/0002* (2013.01); *G06K 9/0004* (2013.01); *G06K 9/00046* (2013.01); *G06K 9/6215* (2013.01); *G01L 1/24* (2013.01)

(58) Field of Classification Search
CPC .. G06K 9/0008; G06K 9/6215; G06K 9/0004; G06K 9/0002; G01L 1/24; G06F 1/3206; G06F 3/04817; G06F 3/0416; G06F 3/041; G09G 5/10
See application file for complete search history.

(56) References Cited

U.S. PATENT DOCUMENTS

| | | | |
|---|---|---|---|
| 6,578,436 B1 * | 6/2003 | Ganapathi | ............ G06K 9/0002 |
| | | | 73/862.046 |
| 6,694,822 B1 * | 2/2004 | Ganapathi | ............... G01L 1/125 |
| | | | 73/728 |
| 6,941,001 B1 | 9/2005 | Bolle et al. | |

(Continued)

FOREIGN PATENT DOCUMENTS

| | | |
|---|---|---|
| CN | 105094443 A | 11/2015 |
| CN | 105677082 A | 6/2016 |

(Continued)

OTHER PUBLICATIONS

First Office Action issued to Chinese Patent Application No. 201710601710.3, dated Oct. 21, 2019 and English translation (23p).

(Continued)

*Primary Examiner* — Amir Alavi
(74) *Attorney, Agent, or Firm* — Arch & Lake LLP

(57) ABSTRACT

The present disclosure provides a pressure determination method and device. The pressure determination method includes: fingerprint information from a preset region of a terminal is acquired, and the fingerprint information includes multiple first signals corresponding to ridges of a fingerprint and multiple second signals corresponding to valleys of the fingerprint; and a pressure on the preset region is determined according to a relationship between the first signals and the second signals.

18 Claims, 14 Drawing Sheets

(56) References Cited

U.S. PATENT DOCUMENTS

| | | | | |
|---|---|---|---|---|
| 7,059,201 B2* | 6/2006 | Prakash | ............... | G06K 9/0002 |
| | | | | 73/862.041 |
| 8,433,110 B2* | 4/2013 | Kropp | ................ | A61B 5/02444 |
| | | | | 382/124 |
| 8,515,135 B2* | 8/2013 | Clarke | ................ | G06K 9/0002 |
| | | | | 310/318 |
| 10,185,867 B1* | 1/2019 | Ryshtun | ............... | G06K 9/0008 |
| 2001/0036299 A1 | 11/2001 | Senior | | |
| 2004/0046574 A1 | 3/2004 | Chou | | |
| 2006/0078174 A1 | 4/2006 | Russo | | |
| 2018/0053029 A1* | 2/2018 | Jiang | ................. | G06K 9/00087 |
| 2018/0365465 A1* | 12/2018 | Kim | ....................... | G06K 9/001 |
| 2019/0026526 A1* | 1/2019 | Tang | ................... | G06K 9/0002 |
| 2019/0034685 A1* | 1/2019 | Tang | ................. | G06K 9/00013 |
| 2019/0369695 A1* | 12/2019 | Wang | ................. | G06K 9/00006 |
| 2019/0370525 A1* | 12/2019 | Wang | ................. | G06K 9/0004 |
| 2020/0002977 A1* | 1/2020 | Russi-Vigoya | ........... | E05B 1/00 |

FOREIGN PATENT DOCUMENTS

| | | |
|---|---|---|
| CN | 105844241 A | 8/2016 |
| CN | 106529454 A | 3/2017 |
| CN | 106537415 A | 3/2017 |
| WO | 2017114062 A1 | 7/2017 |

OTHER PUBLICATIONS

Search Report in European Patent Application No. 18184799.7, dated Jan. 4, 2019, 41 pages.
Maltoni et al: "Handbook of Fingerprint Recognition, 2nd ed", Jan. 1, 2009 (Jan. 1, 2009), Springer, XP055536583, p. 93,145, figures 2.26(b), 3.40.

* cited by examiner

PRESSURE DETERMINATION METHOD AND DEVICE AND FINGERPRINT RECOGNITION METHOD AND DEVICE

CROSS-REFERENCE TO RELATED APPLICATIONS

This application is filed based upon and claims priority to Chinese Patent Application No. 201710601710.3, filed on Jul. 21, 2017, the entire content of which is incorporated herein by reference for all purposes.

TECHNICAL FIELD

The present disclosure generally relates to the technical field of terminal, and more particularly, to a method, electronic equipment and a computer-readable storage medium for pressure determination.

BACKGROUND

For determining pressure that a user may add on a terminal, an independent pressure sensor is required to be arranged in the terminal. When the user presses a certain region of the terminal, a displacement may occur on the region of the terminal, and the pressure sensor may determine the pressure according to the displacement. Such a pressure determination manner requires the pressure sensor to be independently arranged in the terminal.

SUMMARY

The present disclosure discloses a method, electronic equipment and a non-transitory computer-readable storage medium for determining a pressure.

According to a first aspect of the present disclosure, a pressure determination method is provided, the method may include: acquiring fingerprint information from a preset region of the terminal, where the fingerprint information may include a plurality of first signals corresponding to ridges of a fingerprint and a plurality of second signals corresponding to valleys of the fingerprint; and determining a pressure on the preset region according to a relationship between the first signals and the second signals.

According to a second aspect of the examples of the present disclosure, electronic equipment is provided, and the electronic equipment may include: a processor; and a memory configured to store an instruction executable by the processor, where the processor may be configured to: acquire fingerprint information from a preset region of a terminal, where the fingerprint information may include a plurality of first signals corresponding to ridges of a fingerprint and a plurality of second signals corresponding to valleys of the fingerprint; and determine a pressure on the preset region according to a relationship between the first signals and the second signals.

According to a third aspect of the present disclosure, a non-transitory computer-readable storage medium is provided having stored therein a computer program that, when the computer program is executed by a processor, may cause the processor to implement: acquiring fingerprint information from a preset region of a terminal, where the fingerprint information may include a plurality of first signals corresponding to ridges of a fingerprint and a plurality of second signals corresponding to valleys of the fingerprint; and determining a pressure on the preset region according to a relationship between the first signals and the second signals.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
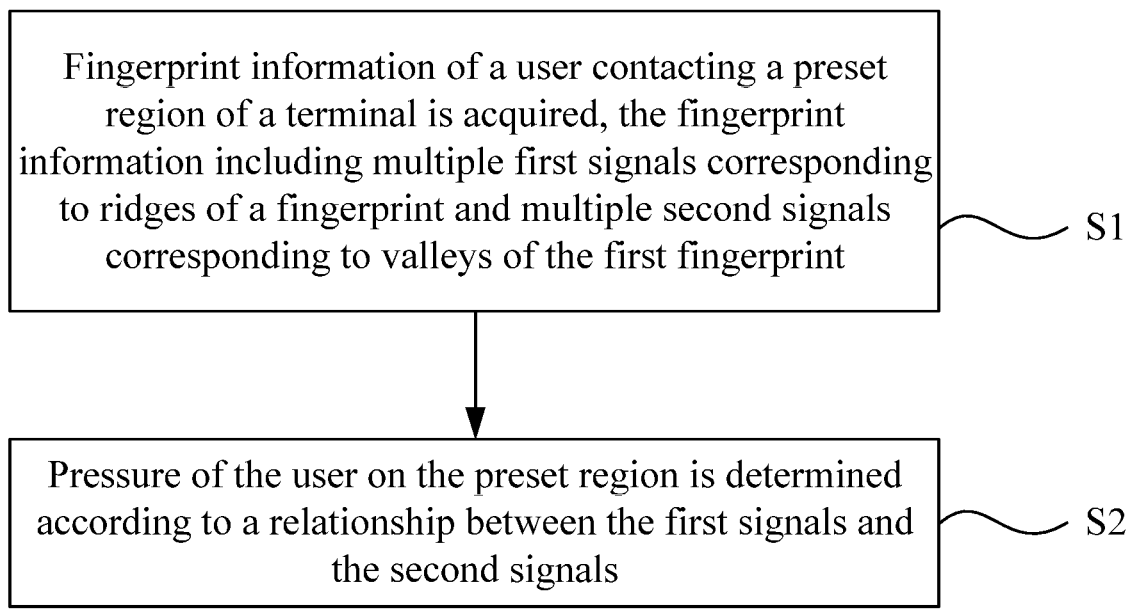
FIG. 1 is a schematic flow chart showing a pressure determination method, according to an example.

FIG. 1 is a schematic flow chart showing a pressure determination method, according to an example. The example may be applied to a fingerprint recognition module, and the fingerprint recognition module may be arranged in electronic equipment such as a mobile phone and a tablet computer. As shown in FIG. 1, the pressure determination method includes the following steps.

In Step S1, fingerprint information of a user contacting a preset region of a terminal is acquired, the fingerprint information including multiple first signals corresponding to ridges of a fingerprint and multiple second signals corresponding to valleys of the fingerprint.

In Step S2, pressure of the user on the preset region is determined according to a relationship between the first signals and the second signals.

In an example, the preset region of the terminal may be provided with the fingerprint recognition module, and then, when a finger of the user contacts the preset region, the fingerprint recognition module may recognize the fingerprint on the finger, thereby acquiring the fingerprint information, wherein the fingerprint may be recognized through a capacitive sensor, the fingerprint may also be recognized through a photoelectric sensor, and the fingerprint may further be recognized through an ultrasonic sensor. A recognition manner may specifically be selected according to a requirement, and moreover, a sensor adopted to recognize the fingerprint is also not limited to the abovementioned three.

Figure 2:
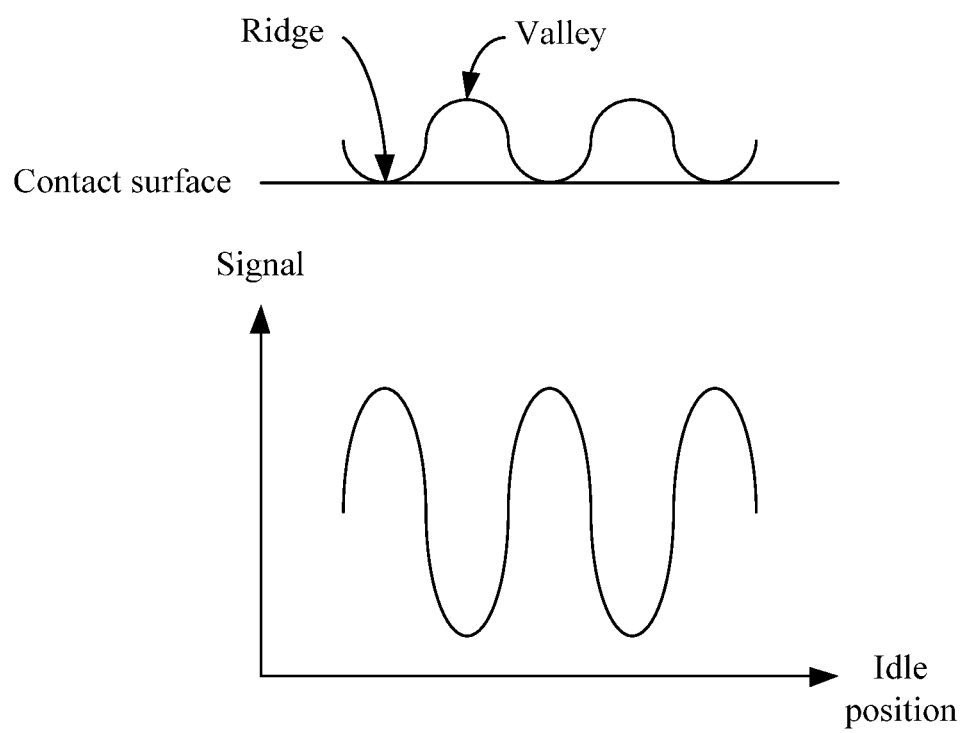
FIG. 2 is a schematic diagram illustrating differences between signals of valleys and ridges of a fingerprint, according to an example.

FIG. 2 is a schematic diagram illustrating differences between signals of valleys and ridges of a fingerprint, according to an example.

In an example, as shown in FIG. 2, the fingerprint includes the valleys and the ridges, and when the finger contacts the fingerprint recognition module, the ridges are closer to a contact surface (for example, may be attached to the contact surface), and the valleys are farer away from the contact surface. For example, for an optical sensor, the optical sensor may emit light to the valleys and ridges of the fingerprint and receive light reflected by the valleys and the ridges. Herein since the ridges are closer to the contact surface, namely closer to the optical sensor in the contact surface, the light reflected back to the optical sensor by the ridges is stronger, and the first signals, determined by the optical sensor, corresponding to the ridges are stronger. Correspondingly, since the valleys are farer away from the contact surface, namely farer away from the optical sensor in the contact surface, the light reflected back to the optical sensor by the valleys is weaker, and the second signals, determined by the optical sensor, corresponding to the valleys are weaker.

Figure 3:
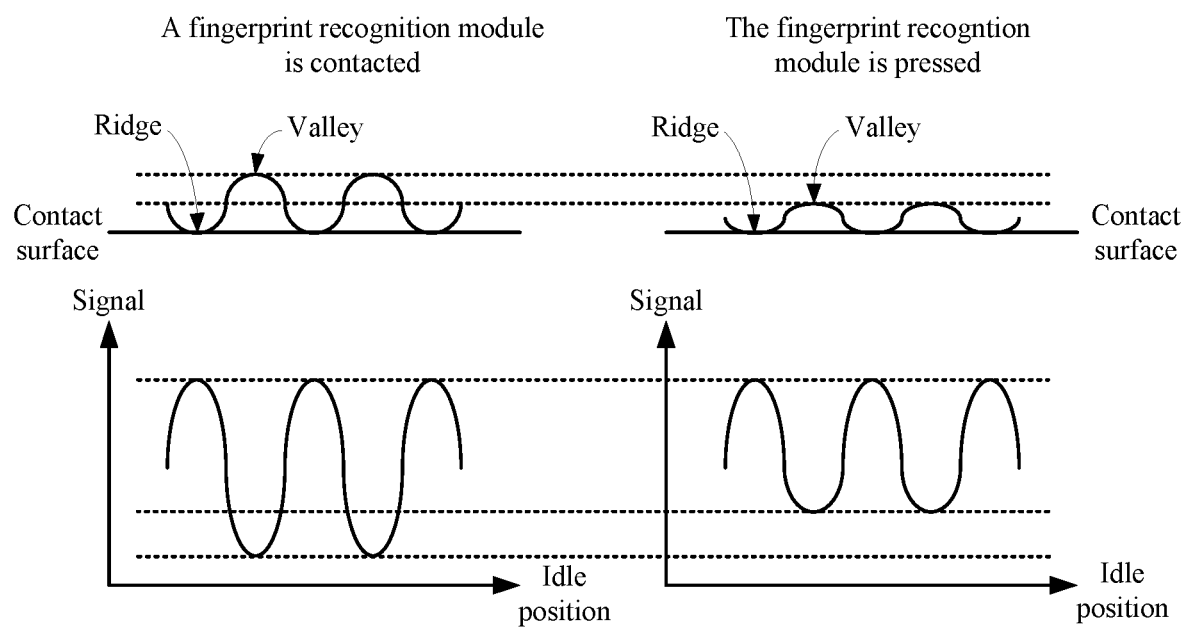
FIG. 3 is a schematic diagram illustrating differences between signals when the pressure is determined and the pressure is not determined, according to an example.

FIG. 3 is a schematic diagram illustrating differences between signals when the pressure is determined and the pressure is not determined, according to an example.

In an example, as shown in FIG. 3, when the user presses the fingerprint recognition module, relative to only contact with the fingerprint recognition module, different pressure is applied to the fingerprint recognition module. Herein when the user only contacts the fingerprint recognition module but does not press the fingerprint recognition module, pressure applied to the fingerprint recognition module is lower, and distances between the valleys of the fingerprint and the contact surface are almost kept unchanged; and when the fingerprint recognition module is pressed, the pressure applied to the fingerprint recognition module is higher, so that the distances between the valleys of the fingerprint and the contact surface are reduced, while distances between the ridges, which are attached to the contact surface, of the fingerprint and the contact surface are kept unchanged.

Since the distances between the ridges of the fingerprint and the contact surface are kept unchanged, while the distances between the valleys of the fingerprint and the contact surface are reduced, that is, the first signals corresponding to the ridges are kept unchanged, while the second signals corresponding to the valleys are strengthened, the relationship between the first signals and the second signals may be changed, which is directly represented by reduction in a difference value between the first signals corresponding to the ridges and the second signals corresponding to the valleys. Therefore, a threshold may be preset, whether the difference value between the first signals and the second signals is smaller than the threshold or not is judged, and if the difference value is smaller than the threshold, it may be determined that the user presses the fingerprint recognition module with high pressure.

Besides the abovementioned change of the relationship between the first signals and the second signals, pressing the fingerprint recognition module may further cause other changes. For example, when the user contacts the fingerprint recognition module but does not press the fingerprint recognition module, the pressure of the user on the fingerprint recognition module is distributed within a larger signal strength interval, which is directly represented by smaller numbers of corresponding signals at respective mean values of the first signals and the second signals. When the user presses the fingerprint recognition module, the pressure of the user on the fingerprint recognition module may be strengthened, wherein maximum pressure is almost kept unchanged, but minimum pressure may be strengthened, so that the pressure of the user on the fingerprint recognition module is distributed within a smaller signal strength interval, which is directly represented by larger numbers of the corresponding signals at the respective mean values of the first signals and the second signals.

A magnitude of the pressure of the user on the preset region may be determined according to each relationship between the first signals and the second signals. Obviously, according to the example, the pressure may be determined by acquiring the fingerprint information and analyzing the fingerprint information, so that the original fingerprint recognition module in the terminal may be adopted to acquire the fingerprint information and analyze the fingerprint information, no pressure sensor is required to be independently arranged, and reduction in hardware cost of the terminal and reduction in a space occupied by hardware are facilitated.

Furthermore, if it is determined that the pressure is high, it may be determined that the user presses the fingerprint recognition module for fingerprint recognition, and the first signals and the second signals are further processed to generate a fingerprint pattern. If the difference value is not smaller than the threshold, it may be determined that the user presses the fingerprint recognition module with low pressure not for fingerprint recognition, so that the first signals and the second signals are not subsequently processed.

On such a basis, in the example, whether the user applies high pressure to the fingerprint recognition module or not may be determined to subsequently determine whether the user is required to perform fingerprint recognition or not according to the relationship between the first signals corresponding to the ridges of the fingerprint of the user and the second signals corresponding to the valleys, wherein no pressure sensor is required to be arranged, so that the hardware cost is reduced. Moreover, in a fingerprint recognition process, operations of determining the first signals and the second signals and determining the pressure of the user on the preset region may be completed by a chip of the fingerprint recognition module, and if it is determined that the pressure of the user on the preset region is higher than a preset pressure threshold, the fingerprint pattern may be directly generated according to the first signals and the second signals, so that a delay caused by the fact that a pressure sensor determines pressure of the user on a fingerprint recognition sensor at first and then the chip of the fingerprint recognition module generates the fingerprint pattern according to the first signals and the second signals may be avoided.

Figure 4:
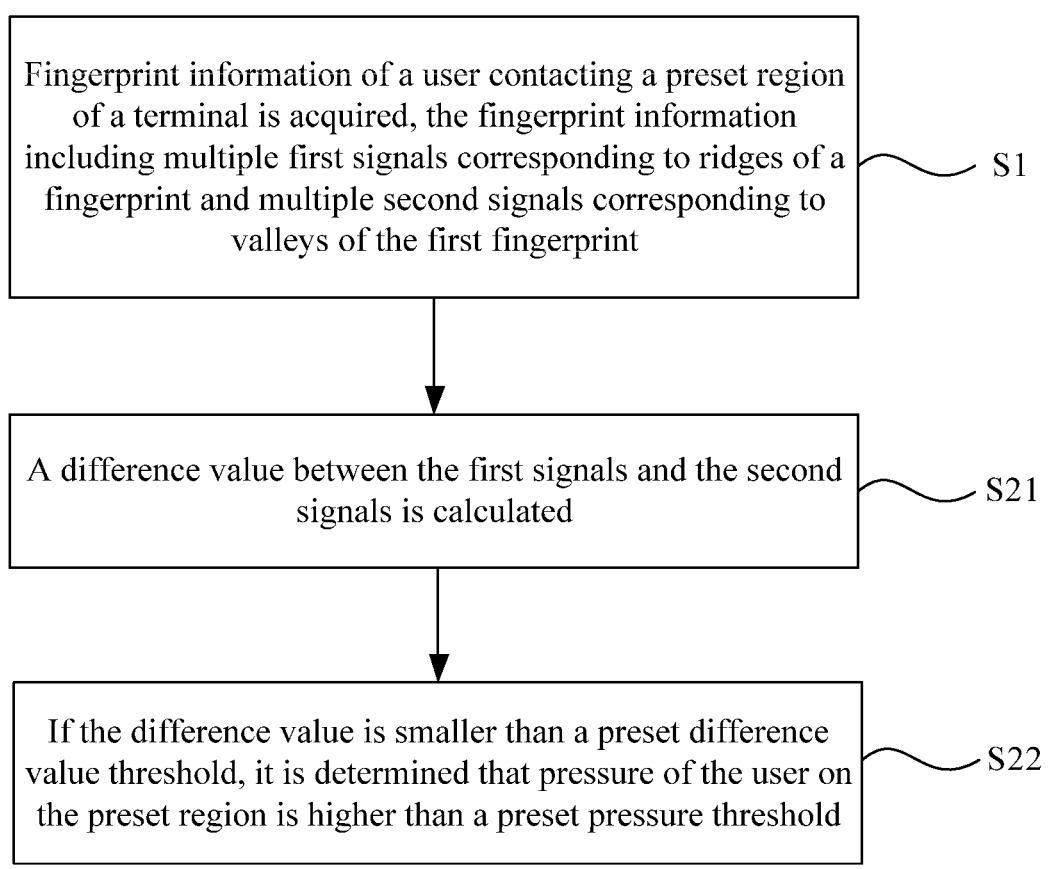
FIG. 4 is a schematic flow chart showing another pressure determination method, according to an example.

FIG. 4 is a schematic flow chart showing another pressure determination method, according to an example. As shown in FIG. 4, on the basis of the example shown in FIG. 1, the step that the pressure of the user on the preset region is determined according to the relationship between the first signals and the second signals includes the following steps.

In Step S21, a difference value between the first signals and the second signals is calculated.

In Step S22, if the difference value is smaller than a preset difference value threshold, it is determined that the pressure of the user on the preset region is higher than a preset pressure threshold.

In an example, from the example shown in FIG. 1 and FIG. 3, it can be seen that, when the user presses the fingerprint recognition module for fingerprint recognition, relative to accidental contact with the fingerprint recognition module not for fingerprint recognition, different pressure is applied to the fingerprint recognition module. Herein during fingerprint recognition, the pressure applied to the fingerprint recognition module is higher, so that the distances between the valleys of the fingerprint and the contact surface are reduced, while the distances between the ridges, which are attached to the contact surface, of the fingerprint and the contact surface are kept unchanged.

Since the distances between the ridges of the fingerprint and the contact surface are kept unchanged, while the distances between the valleys of the fingerprint and the contact surface are reduced, that is, the first signals corresponding to the ridges are kept unchanged, while the second signals corresponding to the valleys are strengthened, the relationship between the first signals and the second signals may be changed, which is directly represented by reduction in the difference value between the first signals corresponding to the ridges and the second signals corresponding to the valleys. Therefore, a difference value threshold may be preset, whether the difference value between the first signals and the second signals is smaller than the preset difference value threshold or not is judged, and if the difference value is smaller than the preset difference value threshold, it may be determined that the user presses the fingerprint recognition module with high pressure for fingerprint recognition, that is, the pressure of the user is higher than the preset pressure threshold.

Figure 5:
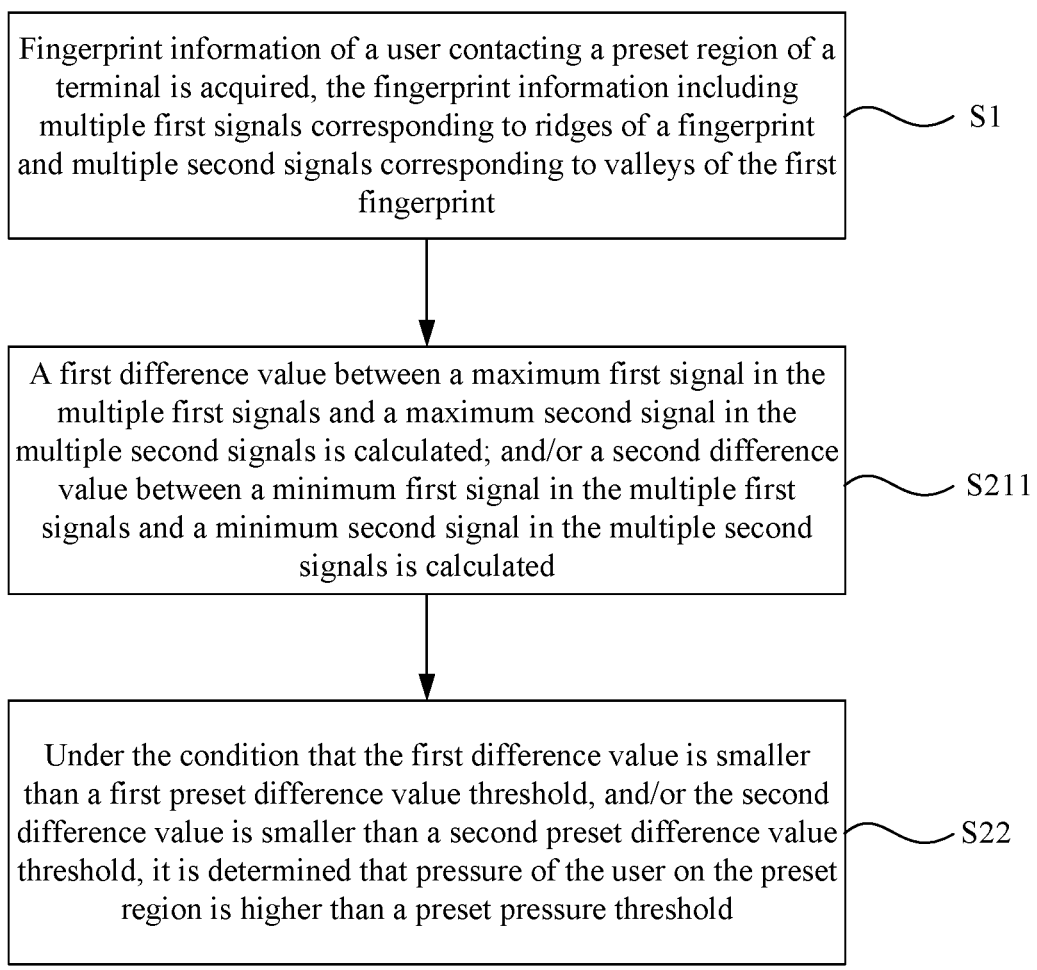
FIG. 5 is a schematic flow chart showing another pressure determination method, according to an example.

FIG. 5 is a schematic flow chart showing another pressure determination method, according to an example. As shown in FIG. 5, on the basis of the example shown in FIG. 4, the step that the difference value between the first signals and the second signals is calculated includes the following steps.

In Step S211, a first difference value between a maximum first signal of the multiple first signals and a maximum second signal of the multiple second signals is calculated; and/or a second difference value between a minimum first signal of the multiple first signals and a minimum second signal of the multiple second signals is calculated, herein under the condition that the first difference value is smaller than a first preset difference value threshold, and/or the second difference value is smaller than a second preset difference value threshold, it is determined that the pressure of the user on the preset region is higher than the preset pressure threshold.

In an example, calculation of the difference value between the first signals and the second signals may specifically be calculation of the first difference value between the maximum first signals and the maximum second signals and/or calculation of the second difference value between the minimum first signals and the minimum second signals.

Multiple sensors are arranged in the fingerprint recognition module, and during fingerprint recognition, each sensor may generate a signal about a valley or ridge of the fingerprint, that is, the multiple sensors may generate multiple signals about the valleys or ridges of the fingerprint.

If a first signal is randomly selected from the multiple first signals corresponding to the ridges and a second signal is randomly selected from the second signals corresponding to the valleys for difference value calculation, since the first signal and the second signal are both randomly selected, if the selected first signal is the maximum first signal of the multiple first signals corresponding to the ridges and the selected second signal is the minimum second signal of the multiple second signals corresponding to the valleys, the difference value between the first signals and the second signals may be excessively large.

While under the condition that the user presses a touch module for fingerprint recognition, if the obtained difference value between the first signals and the second signals is excessively large, even larger than the preset difference value threshold, an obtained judgment result may be inaccurate, and the fingerprint acquisition module may further not generate the fingerprint pattern according to the first signals and the second signals during subsequent fingerprint recognition of the user.

According to the example, under a normal condition, both the first difference value between the maximum first signal of the multiple first signals corresponding to the ridges and the maximum second signal of the multiple second signals corresponding to the valleys and the second difference value between the minimum first signal of the multiple first signals corresponding to the ridges and the minimum second signal of the multiple second signals corresponding to the valleys may not be excessively large, so that the phenomenon that a level of the pressure of the user is determined to be lower under the condition that the user presses the touch module with higher pressure may be avoided. Therefore, whether the pressure of the user on the touch module is higher or not (that is, the fingerprint recognition module is pressed for fingerprint recognition) may be accurately determined according to whether the first difference value is smaller than the first preset difference value threshold or not and according to whether the second difference value is smaller than the second preset difference value threshold or not, and under the condition of higher pressure, the fingerprint pattern is generated according to the first signals and the second signals.

Herein the first difference value between the maximum first signal of the multiple first signals and the maximum second signal of the multiple second signals may be calculated only, and under the condition that the first difference value is smaller than the first preset difference value threshold, the fingerprint pattern is generated according to the first signals and the second signals. The second difference value between the minimum first signal of the multiple first signals and the minimum second signal of the multiple second signals may also be calculated only, and under the condition that the second difference value is smaller than the second preset difference value threshold, the fingerprint pattern is generated according to the first signals and the second signals. The first difference value and the second difference value may further both be calculated, and under the condition that the first difference value is smaller than the first preset difference value threshold and the second difference value is smaller than the second preset difference value threshold, the fingerprint pattern is generated according to the first signals and the second signals.

The maximum first signal of the multiple first signals may refer to the signal out of the multiple first signals that has the maximum signal strength. The minimum first signal of the multiple first signals may refer to the signal out the multiple first signals that has the minimum strength.

Figure 6:
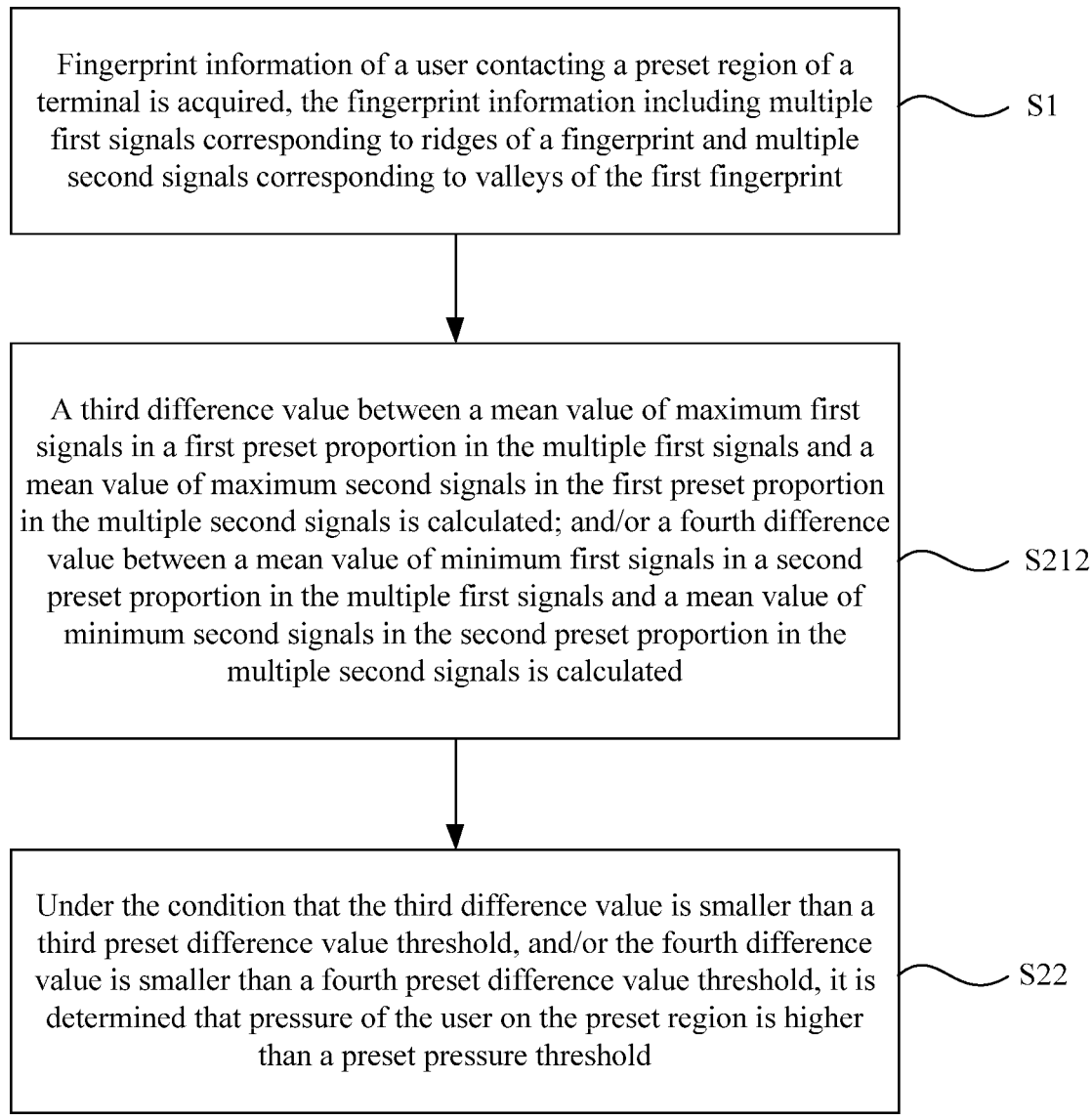
FIG. 6 is a schematic flow chart showing another pressure determination method, according to an example.

FIG. 6 is a schematic flow chart showing another pressure determination method, according to an example. As shown in FIG. 6, on the basis of the example shown in FIG. 4, the step that the difference value between the first signals and the second signals is calculated includes the following steps.

In Step S212, a third difference value between a mean value of first signals top-ranked in a first preset proportion of the multiple first signals and a mean value of second signals top-ranked in the first preset proportion of the multiple second signals is calculated; and/or a fourth difference value between a mean value of first signals bottom-ranked in a second preset proportion of the multiple first signals and a mean value of second signals bottom-ranked in the second preset proportion of the multiple second signals is calculated.

When the third difference value is smaller than a third preset difference value threshold, and/or the fourth difference value is smaller than a fourth preset difference value threshold, it is determined that the pressure of the user on the preset region is higher than the preset pressure threshold.

A mean value of first signals that are top-ranked in a first preset proportion of the multiple first signals may refer to a mean value of a number of selected first signals out of multiple first signals, and the number of selected first signals are top ranked based on a preset ratio of the first signals. For example, if there are 10,000 first signals and the preset proportion is 10%, then 1,000 signals out of 10,000 first signals are selected. These 1,000 selected signals are top-ranked when their signal strengths are among top 1000 in 10,000 signals. A mean value of the selected 1000 top-ranked signal strengths may then be calculated. Similarly, the bottom ranked signals may refer to signals that have the weakest signal strengths. For example, 1000 bottom-ranked signals out of 10,000 signals may refer to the 1000 signals whose signal strengths are among the 1000 weakest ones out of 10,000 signals.

On the basis of the example shown in FIG. 5, whether the pressure of the user on the fingerprint recognition module is higher or not may be accurately determined under most conditions. However, since there may exist noise in the recognition process and the noise may make the maximum first signal of the multiple first signals corresponding to the ridges excessively strong, the first difference value may be excessively large; and the noise may also make the minimum second signal of the multiple second signals corresponding to the valleys too weak, so that the second difference value may be excessively large. No matter whether the first difference value is excessively large, or the second difference value is excessively large, a judgment result of the fingerprint recognition module about the pressure applied by the user may be inaccurate, and when the user applies high pressure to the fingerprint recognition module for fingerprint recognition, the fingerprint acquisition module does not generate the fingerprint pattern according to the first signals and the second signals.

According to the example, no difference value is calculated for one first signal and one second signal, but a difference value is calculated for a mean value of first signals top-ranked in a first preset proportion of the multiple first signals and a mean value of second signals top-ranked in the first preset proportion of the multiple second signals, that is, a difference value is calculated for a mean value of the multiple first signals and a mean value of the multiple second signals. Calculating a mean value of multiple signals may eliminate influence of the noise to a great extent, ensure the signals consistent with own characteristics, for example, ensuring that the maximum first signals and the maximum second signals may not be excessively strong while the minimum first signals and the minimum second signals may not be too weak, and further ensure that the calculated third difference value and fourth difference value are relatively accurate, that is, it is ensured that the fingerprint recognition module accurately judges the magnitude of the pressure applied to the fingerprint recognition module by the user, thereby ensuring that the fingerprint acquisition module generates the fingerprint pattern according to the first signals and the second signals when the user applies high pressure to the fingerprint recognition module for fingerprint recognition.

Herein the first preset proportion and the second preset proportion may be set according to a requirement. For example, under the condition that preset numbers of the first signals and the second signals are 10,000 respectively, the first preset proportion and the second preset proportion may be set to be 10% respectively, that is, a difference value of a mean value of 1,000 first signals and a mean value of 1,000 second signals is calculated.

Figure 7:
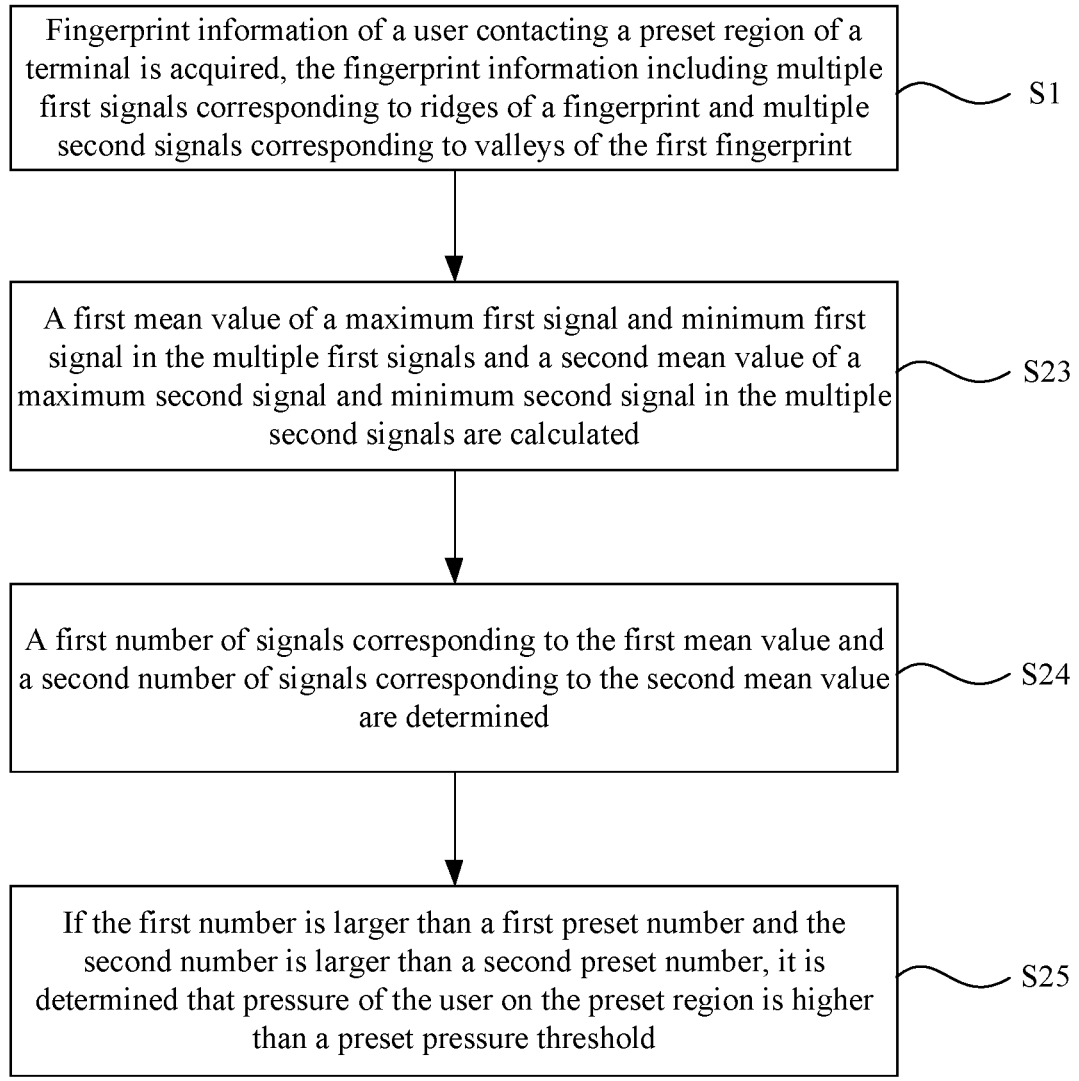
FIG. 7 is a schematic flow chart showing another pressure determination method, according to an example.

FIG. 7 is a schematic flow chart showing another pressure determination method, according to an example. As shown in FIG. 7, on the basis of the example shown in FIG. 1, the step that the pressure of the user on the preset region is determined according to the relationship between the first signals and the second signals includes the following steps.

In Step S23, a first mean value of the maximum first signal and minimum first signal of the multiple first signals and a second mean value of the maximum second signal and minimum second signal of the multiple second signals are calculated.

In Step S24, a first number of signals corresponding to the first mean value and a second number of signals corresponding to the second mean value are determined.

In Step S25, if the first number is larger than a first preset number and the second number is larger than a second preset number, it is determined that the pressure of the user on the preset region is higher than the preset pressure threshold.

Figure 8:
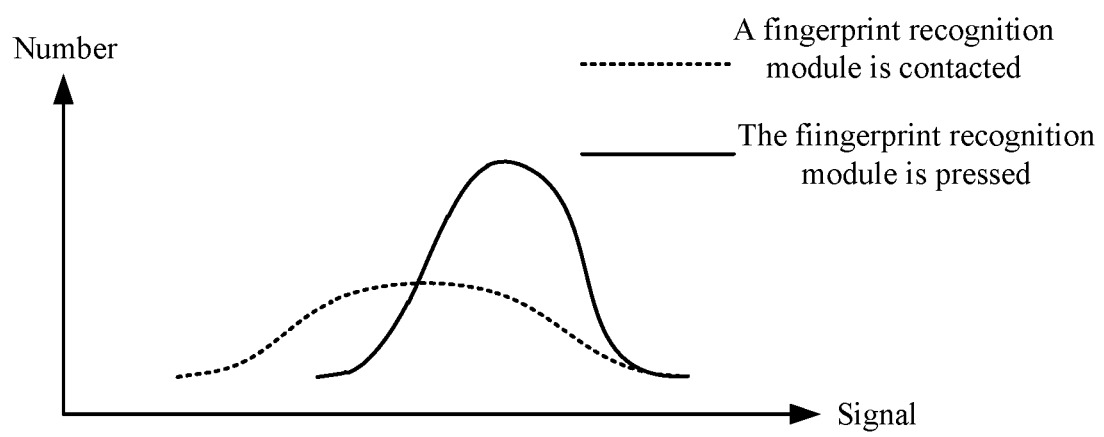
FIG. 8 is a schematic diagram illustrating a corresponding relationship between signals and a number, according to an example.

FIG. 8 is a schematic diagram illustrating a corresponding relationship between signals and a number, according to an example.

In an example, as shown in FIG. 8, the signals represented therein may be the first signals corresponding to the ridges, and may also be the second signals corresponding to the valleys.

When the user contacts the fingerprint recognition module but does not press the fingerprint recognition module, the pressure of the user on the fingerprint recognition module is distributed within the larger signal strength interval, which is directly represented by the smaller numbers of the corresponding signals at the respective mean values of the first signals and the second signals. The relationship between the signals (strength) and the (signal) number is shown as the dotted line in FIG. 8, wherein a difference value between a maximum signal and a minimum signal is relatively large, and a number of signals corresponding to a mean value of the maximum signal and the minimum signal is not so large.

When the user presses the fingerprint recognition module, the pressure of the user on the fingerprint recognition module may be strengthened, wherein the maximum pressure is almost kept unchanged, but the minimum pressure may be strengthened, so that the pressure of the user on the fingerprint recognition module is distributed within the smaller signal strength interval, which is directly represented by the larger numbers of the corresponding signals at the respective mean values of the first signals and the second signals. The relationship between the signals and the number is shown as the full line in FIG. 8, wherein the difference value between the maximum signal and the minimum signal is smaller than the difference value, shown as the dotted line in FIG. 8, between the maximum signal and the minimum signal, a number of the sensors in the fingerprint recognition module is kept unchanged, and a number of the sensed signals is also kept unchanged, so that, relative to the condition that the user only contacts but does not press the fingerprint recognition module, a number of signals corresponding to each signal strength may also be increased, and the number of the signals corresponding to the mean value of the maximum signal and the minimum signal is increased most.

Therefore, for the first signals and the second signals, whether the numbers of the signals corresponding to the mean values of the maximum signals and minimum signals therein are larger or not may be judged, and if YES, that is, the first number of the signals corresponding to the first mean value of the maximum first signal and the minimum first signal is larger than the first preset number and the second number corresponding to the second mean value of the maximum second signal and the minimum second signal is larger than the second preset number, it is determined that the pressure of the user on the preset region is higher than the preset pressure threshold.

Furthermore, the judgment condition of the example may be combined with the judgment condition of judging whether the difference value is smaller than the preset difference value threshold or not in the example shown in FIG. 4, and only under the condition that the two judgment conditions are met, it is determined that the pressure of the user on the preset region is higher than the preset pressure threshold, that is, it is determined that the user presses the fingerprint recognition module, so that it is ensured that whether the user presses the fingerprint recognition module or not may be determined more accurately.

Figure 9:
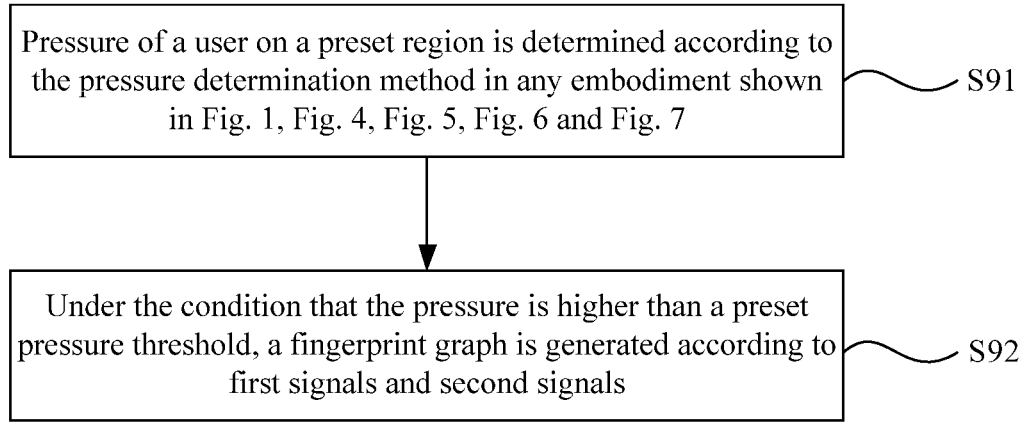
FIG. 9 is a schematic flow chart showing a fingerprint recognition method, according to an example.

FIG. 9 is a schematic flow chart showing a fingerprint recognition method, according to an example. The fingerprint recognition method may be applied to a fingerprint recognition module, and the fingerprint recognition module may be arranged in electronic equipment such as a mobile phone and a tablet computer. The fingerprint recognition method includes the following steps.

In Step S91, pressure of a user on a preset region is determined according to the pressure determination method in any example shown in FIG. 1, FIG. 4, FIG. 5, FIG. 6 and FIG. 7.

In Step S92, under the condition that the pressure is higher than a preset pressure threshold, a fingerprint pattern is generated according to first signals and second signals.

According to the examples shown in FIG. 1, FIG. 4, FIG. 5, FIG. 6 and FIG. 7, a condition of the pressure of the user may be accurately judged, it may further be determined that the user presses the fingerprint recognition module under the condition that the pressure of the user is higher than the preset pressure threshold, and then the fingerprint pattern is generated according to the first signals and the second signals, wherein no pressure sensor is required to be arranged, so that hardware cost is reduced. Moreover, in a fingerprint recognition process, operations of determining the first signals and the second signals and determining the pressure of the user on the preset region may be completed by a chip of the fingerprint recognition module, and if it is determined that the pressure of the user on the preset region is higher than the preset pressure threshold, the fingerprint pattern may be directly generated according to the first signals and the second signals, so that a delay caused by the fact that a pressure sensor determines pressure of the user on a fingerprint recognition sensor at first and then the chip of the fingerprint recognition module generates the fingerprint pattern according to the first signals and the second signals may be avoided.

Correspondingly to the examples of the pressure determination method and the fingerprint recognition method, the present disclosure further provides examples of a pressure determination device and a fingerprint recognition device.

Figure 10:
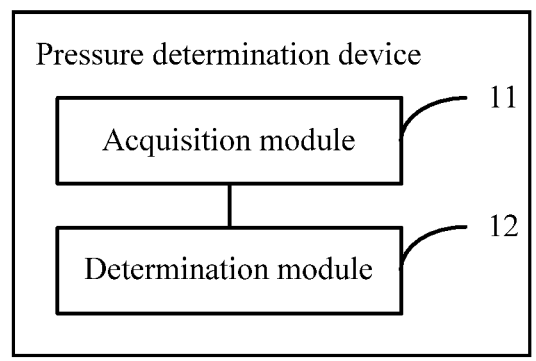
FIG. 10 is a schematic block diagram of a pressure determination device, according to an example.

FIG. 10 is a schematic block diagram of a pressure determination device, according to an example. As shown in FIG. 10, the fingerprint recognition device includes:

an acquisition module 11, configured to acquire fingerprint information of a user contacting a preset region of a terminal, the fingerprint information including multiple first signals corresponding to ridges of a fingerprint and multiple second signals corresponding to valleys of the fingerprint; and a determination module 12, configured to determine pressure of the user on the preset region according to a relationship between the first signals and the second signals.

Figure 11:
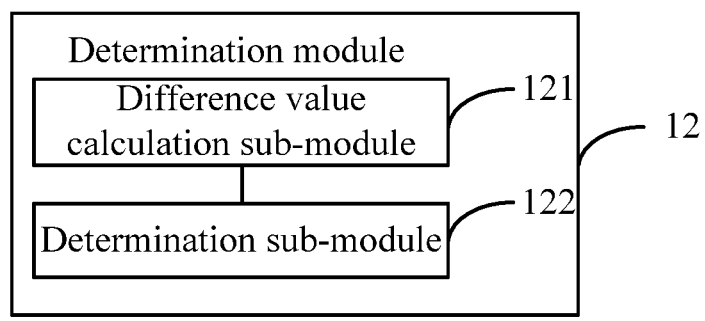
FIG. 11 is a schematic block diagram of a determination module, according to an example.

FIG. 11 is a schematic block diagram of a determination module, according to an example. As shown in FIG. 11, on the basis of the example shown in FIG. 10, the determination module 12 includes:

a difference value calculation sub-module 121, configured to calculate a difference value between the first signals and the second signals; and a determination sub-module 122, configured to, under the condition that the difference value is smaller than a preset difference value threshold, determine that the pressure of the user on the preset region is higher than a preset pressure threshold.

Optionally, the difference value calculation sub-module is configured to:

calculate a first difference value between a maximum first signal of the multiple first signals and a maximum second signal of the multiple second signals; and/or calculate a second difference value between a minimum first signal of the multiple first signals and a minimum second signal of the multiple second signals, herein under the condition that the first difference value is smaller than a first preset difference value threshold, and/or the second difference value is smaller than a second preset difference value threshold, the determination sub-module determines that the pressure of the user on the preset region is higher than the preset pressure threshold.

Optionally, the difference value calculation sub-module is configured to:

calculate a third difference value between a mean value of first signals top-ranked in a first preset proportion of the multiple first signals and a mean value of second signals top-ranked in the first preset proportion of the multiple second signals; and/or calculate a fourth difference value between a mean value of first signals bottom-ranked in a second preset proportion of the multiple first signals and a mean value of second signals bottom-ranked in the second preset proportion of the multiple second signals, herein under the condition that the third difference value is smaller than a third preset difference value threshold, and/or the fourth difference value is smaller than a fourth preset difference value threshold, the determination sub-module determines that the pressure of the user on the preset region is higher than the preset pressure threshold.

Figure 12:
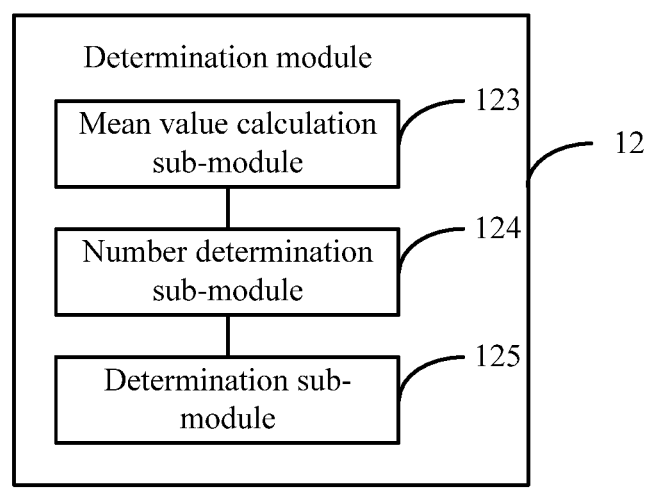
FIG. 12 is a schematic block diagram of another determination module, according to an example.

FIG. 12 is a schematic block diagram of another determination module, according to an example. As shown in FIG. 12, on the basis of the example shown in FIG. 10, the determination module includes:

a mean value calculation sub-module 123, configured to calculate a first mean value of the maximum first signal and minimum first signal of the multiple first signals and a second mean value of the maximum second signal and minimum second signal of the multiple second signals;

a number determination sub-module 124, configured to determine a first number of signals corresponding to the first mean value and a second number of signals corresponding to the second mean value; and a determination sub-module 125, configured to, when the first number is larger than a first preset number and the second number is larger than a second preset number, determine that the pressure of the user on the preset region is higher than the preset pressure threshold.

Figure 13:
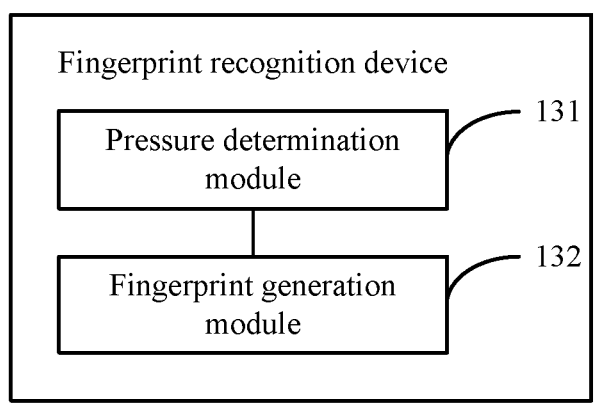
FIG. 13 is a schematic block diagram of a fingerprint recognition device, according to an example.

FIG. 13 is a schematic block diagram of a fingerprint recognition device, according to an example. As shown in FIG. 13, the fingerprint recognition device includes:

a pressure determination module 131, configured to determine pressure of a user on a preset region according to the pressure determination device in any abovementioned example; and a fingerprint generation module 132, configured to, under the condition that the pressure is higher than a preset pressure threshold, generate a fingerprint pattern according to first signals and second signals.

With respect to the devices in the above examples, the specific manners for performing operations for individual modules therein have been described in detail in the example regarding the methods, which will not be elaborated herein.

Since the device examples substantially correspond to the method examples, related parts refer to part of descriptions of the method examples. The device examples described above are only schematic, wherein the modules described as separate parts may or may not be physically separated, and parts displayed as modules may or may not be physical units, and namely may be located in the same place, or may also be distributed to multiple network units. Part or all of the modules may be selected to achieve the purpose of the solutions of the present disclosure according to a practical requirement. It may be understood and implemented by skilled in the art without creative work.

Correspondingly, the present disclosure further provides a pressure determination device, which includes: a processor; and a memory configured to store an instruction executable by the processor, wherein the processor is configured to: acquire fingerprint information of a user contacting a preset region of a terminal, the fingerprint information including multiple first signals corresponding to ridges of a fingerprint and multiple second signals corresponding to valleys of the fingerprint; and determine pressure of the user on the preset region according to a relationship between the first signals and the second signals.

Correspondingly, the present disclosure further provides a fingerprint recognition device, which includes: a processor; and a memory configured to store an instruction executable by the processor, wherein the processor is configured to: acquire fingerprint information of a user contacting a preset region of a terminal, the fingerprint information including multiple first signals corresponding to ridges of a fingerprint and multiple second signals corresponding to valleys of the fingerprint; determine pressure of the user on the preset region according to a relationship between the first signals and the second signals; and under the condition that the pressure is higher than a preset pressure threshold, generate a fingerprint pattern according to the first signals and the second signals.

Correspondingly, the present disclosure further provides a terminal, which includes a memory and one or more than one program, wherein the one or more than one program is stored in the memory, and one or more than one processor is configured to execute the one or more than one program including an instruction configured for the following operations that: fingerprint information of a user contacting a preset region of a terminal is acquired, the fingerprint information including multiple first signals corresponding to ridges of a fingerprint and multiple second signals corresponding to valleys of the fingerprint; and pressure of the user on the preset region is determined according to a relationship between the first signals and the second signals.

Correspondingly, the present disclosure further provides a terminal, which includes a memory and one or more than one program, wherein the one or more than one program is stored in the memory, and one or more than one processor is configured to execute the one or more than one program including an instruction configured for the following operations that: fingerprint information of a user contacting a preset region of a terminal is acquired, the fingerprint information including multiple first signals corresponding to ridges of a fingerprint and multiple second signals corresponding to valleys of the fingerprint; pressure of the user on the preset region is determined according to a relationship between the first signals and the second signals; and under the condition that the pressure is higher than a preset pressure threshold, a fingerprint pattern is generated according to the first signals and the second signals.

Figure 14:
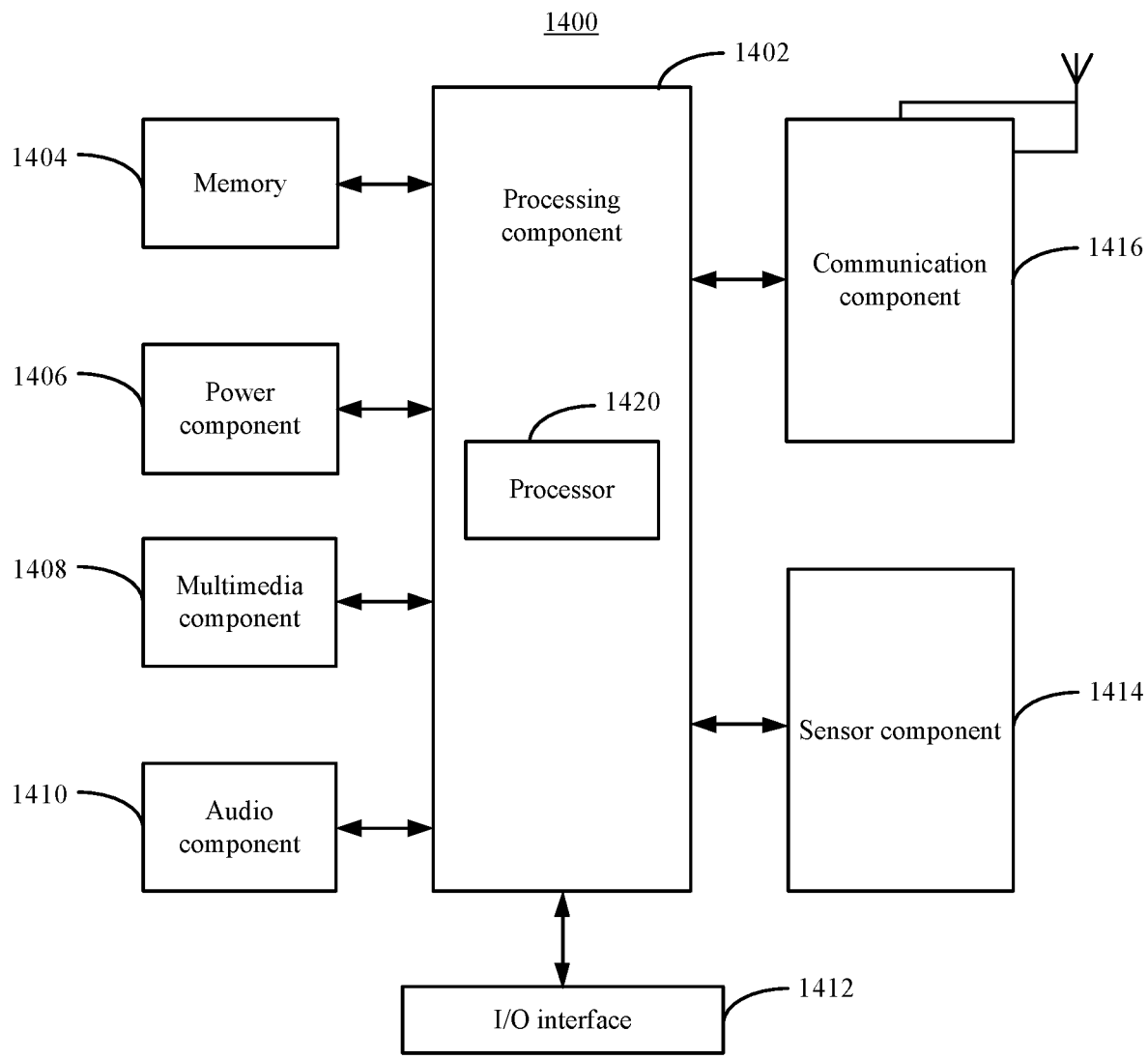
FIG. 14 is a schematic block diagram of a fingerprint recognition device, according to an example.

FIG. 14 is a schematic block diagram of a fingerprint recognition device 1400, according to an example. For example, the device 1400 may be a mobile phone, a computer, a digital broadcast terminal, a messaging device, a gaming console, a tablet, a medical device, exercise equipment, a personal digital assistant and the like.

Referring to FIG. 14, the device 1400 may include one or more of the following components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1420 to execute instructions to perform all or part of the steps in the abovementioned method. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any application programs or methods operated on the device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 provides power for various components of the device 1400. The power component 1406 may include a power management system, one or more power supplies, and other components associated with the generation, management and distribution of power for the device 1400.

The multimedia component 1408 includes a screen providing an output interface between the device 1400 and a user. In some examples, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some examples, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 includes a Microphone (MIC), and the MIC is configured to receive an external audio signal when the device 1400 is in the operation mode, such as a call mode, a recording mode and a voice recognition mode. The received audio signal may be further stored in the memory 1404 or sent through the communication component 1416. In some examples, the audio component 1410 further includes a speaker configured to output the audio signal.

The I/O interface 1412 provides an interface between the processing component 1402 and a peripheral interface module, and the peripheral interface module may be a keyboard, a click wheel, a button and the like. The button may include, but not limited to: a home button, a volume button, a starting button and a locking button.

The sensor component 1414 includes one or more sensors configured to provide status assessment in various aspects for the device 1400. For instance, the sensor component 1414 may detect an on/off status of the device 1400 and relative positioning of components, such as a display and small keyboard of the device 1400, and the sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or Charge Coupled Device (CCD) image sensor, configured for use in an imaging application. In some examples, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and other equipment. The device 1400 may access a communication-standard-based wireless network, such as a Wireless Fidelity (WiFi) network, a 2nd-Generation (2G) or 3rd-Generation (3G) network or a combination thereof. In an example, the communication component 1416 receives a broadcast signal or broadcast associated information from an external broadcast management system through a broadcast channel. In an example, the communication component 1416 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an example, the device 1400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the method of any abovementioned example.

In an example, there is also provided a non-transitory computer-readable storage medium including an instruction, such as the memory 1404 including an instruction, and the instruction may be executed by the processor 1420 of the device 1400 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

According to the examples of the present disclosure, the pressure may be determined by acquiring the fingerprint information and analyzing the fingerprint information, so that an original fingerprint recognition module in the terminal may be adopted to acquire the fingerprint information and analyze the fingerprint information, no pressure sensor is required to be independently arranged, and reduction in hardware cost of the terminal and reduction in a space occupied by hardware are facilitated.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Other examples of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only.

It will be appreciated that the present disclosure is not limited to the exact construction that has been described above and illustrated in the accompanying drawings, and that various modifications and changes may be made without departing from the scope thereof.

What is claimed is:

1. A pressure determination method applied to a terminal, comprising:
    acquiring fingerprint information from a preset region of the terminal, the fingerprint information comprising a plurality of first signals corresponding to ridges of a fingerprint and a plurality of second signals corresponding to valleys of the fingerprint; and
    determining a pressure on the preset region according to a relationship between the first signals and the second signals,
    wherein determining the pressure on the preset region according to the relationship between the first signals and the second signals comprises:
        calculating a difference value between the first signals and the second signals; and
        when the difference value is smaller than a preset difference value threshold, determining that the pressure on the preset region is higher than a preset pressure threshold; or
    wherein determining the pressure on the preset region according to the relationship between the first signals and the second signals comprises:
        calculating a first mean value of a maximum first signal and a minimum first signal of the plurality of first signals and a second mean value of a maximum second signal and a minimum second signal of the plurality of second signals; and
        determining a first number of signals corresponding to the first mean value and a second number of signals corresponding to the second mean value, and
        wherein, when the first number is larger than a first preset number and the second number is larger than a second preset number, it is determined that the pressure on the preset region is higher than the preset pressure threshold.

2. The method of claim 1, wherein calculating the difference value between the first signals and the second signals comprises:
    calculating a first difference value between a maximum first signal of the plurality of first signals and a maximum second signal of the plurality of second signals; and/or
    calculating a second difference value between a minimum first signal of the plurality of first signals and a minimum second signal of the plurality of second signals,
    wherein, under the condition that the first difference value is smaller than a first preset difference value threshold, and/or the second difference value is smaller than a second preset difference value threshold, it is determined that the pressure on the preset region is higher than the preset pressure threshold.

3. The method of claim 1, wherein calculating the difference value between the first signals and the second signals comprises:
    calculating a third difference value between a mean value of first signals that are top-ranked in a first preset proportion of the plurality of first signals and a mean value of second signals that are top-ranked in the first preset proportion of the plurality of second signals; and/or
    calculating a fourth difference value between a mean value of first signals that are bottom-ranked in a second preset proportion of the plurality of first signals and a mean value of second signals that are bottom-ranked in the second preset proportion of the plurality of second signals,
    wherein, under the condition that the third difference value is smaller than a third preset difference value threshold, and/or the fourth difference value is smaller than a fourth preset difference value threshold, it is determined that the pressure on the preset region is higher than the preset pressure threshold.

4. The method according to claim 1, further comprising:
    under the condition that the pressure is higher than the preset pressure threshold, generating a fingerprint pattern according to the first signals and the second signals.

5. The method according to claim 4, wherein calculating the difference value between the first signals and the second signals comprises:

calculating a first difference value between a maximum first signal of the plurality of first signals and a maximum second signal of the plurality of second signals; and/or calculating a second difference value between a minimum first signal of the plurality of first signals and a minimum second signal of the plurality of second signals, wherein, under the condition that the first difference value is smaller than a first preset difference value threshold, and/or the second difference value is smaller than a second preset difference value threshold, it is determined that the pressure on the preset region is higher than the preset pressure threshold.

6. The method according to claim 4, wherein calculating the difference value between the first signals and the second signals comprises:

calculating a third difference value between a mean value of first signals that are top-ranked in a first preset proportion of the plurality of first signals and a mean value of second signals that are top-ranked in the first preset proportion of the plurality of second signals; and/or calculating a fourth difference value between a mean value of first signals that are bottom-ranked in a second preset proportion of the plurality of first signals and a mean value of second signals that are bottom-ranked in the second preset proportion of the plurality of second signals, wherein, under the condition that the third difference value is smaller than a third preset difference value threshold, and/or the fourth difference value is smaller than a fourth preset difference value threshold, it is determined that the pressure on the preset region is higher than the preset pressure threshold.

7. Electronic equipment, comprising:

a processor; and a memory configured to store an instruction executable by the processor, wherein the processor is configured to:

acquire fingerprint information from a preset region of a terminal, the fingerprint information comprising a plurality of first signals corresponding to ridges of a fingerprint and a plurality of second signals corresponding to valleys of the fingerprint; and determine a pressure on the preset region according to a relationship between the first signals and the second signals, wherein, in order to determine the pressure on the preset region according to the relationship between the first signals and the second signals, the processor is further configured to:

calculate a difference value between the first signals and the second signals; and when the difference value is smaller than a preset difference value threshold, determine that the pressure on the preset region is higher than a preset pressure threshold; or wherein, in order to determine the pressure on the preset region according to the relationship between the first signals and the second signals, the processor is further configured to:

calculate a first mean value of a maximum first signal and a minimum first signal of the plurality of first signals and a second mean value of a maximum second signal and a minimum second signal of the plurality of second signals; and determine a first number of signals corresponding to the first mean value and a second number of signals corresponding to the second mean value, and wherein, when the first number is larger than a first preset number and the second number is larger than a second preset number, it is determined that the pressure on the preset region is higher than the preset pressure threshold.

8. The electronic equipment of claim 7, wherein, in order to calculate the difference value between the first signals and the second signals, the processor is further configured to:

calculate a first difference value between a maximum first signal of the plurality of first signals and a maximum second signal of the plurality of second signals; and/or calculate a second difference value between a minimum first signal of the plurality of first signals and a minimum second signal of the plurality of second signals, wherein under the condition that the first difference value is smaller than a first preset difference value threshold, and/or the second difference value is smaller than a second preset difference value threshold, it is determined that the pressure on the preset region is higher than the preset pressure threshold.

9. The electronic equipment of claim 7, wherein, in order to calculate the difference value between the first signals and the second signals, the processor is further configured to:

calculate a third difference value between a mean value of first signals that are top-ranked in a first preset proportion of the plurality of first signals and a mean value of second signals that are top-ranked in the first preset proportion of the plurality of second signals; and/or calculate a fourth difference value between a mean value of first signals that are bottom-ranked in a second preset proportion of the plurality of first signals and a mean value of second signals that are bottom-ranked in the second preset proportion of the plurality of second signals, wherein, under the condition that the third difference value is smaller than a third preset difference value threshold, and/or the fourth difference value is smaller than a fourth preset difference value threshold, it is determined that the pressure on the preset region is higher than the preset pressure threshold.

10. The electronic equipment according to claim 7, wherein the processor is further configured to:

under the condition that the pressure is higher than the preset pressure threshold, generate a fingerprint pattern according to the first signals and the second signals.

11. The electronic equipment of claim 10, wherein, in order to calculate the difference value between the first signals and the second signals, the processor is further configured to:

calculate a first difference value between a maximum first signal of the plurality of first signals and a maximum second signal of the plurality of second signals; and/or calculate a second difference value between a minimum first signal of the plurality of first signals and a minimum second signal of the plurality of second signals, wherein, under the condition that the first difference value is smaller than a first preset difference value threshold, and/or the second difference value is smaller than a second preset difference value threshold, it is determined that the pressure on the preset region is higher than the preset pressure threshold.

12. The electronic equipment of claim 10, wherein, in order to calculate the difference value between the first signals and the second signals, the processor is further configured to:
calculate a third difference value between a mean value of first signals that are top-ranked in a first preset proportion of the plurality of first signals and a mean value of second signals that are top-ranked in the first preset proportion of the plurality of second signals; and/or
calculate a fourth difference value between a mean value of first signals that are bottom-ranked in a second preset proportion of the plurality of first signals and a mean value of second signals that are bottom-ranked in the second preset proportion of the plurality of second signals,
wherein, under the condition that the third difference value is smaller than a third preset difference value threshold, and/or the fourth difference value is smaller than a fourth preset difference value threshold, it is determined that the pressure on the preset region is higher than the preset pressure threshold.

13. A non-transitory computer-readable storage medium having stored therein a computer program that, when executed by a processor, causes the processor to implement:
acquiring fingerprint information from a preset region of a terminal, the fingerprint information comprising a plurality of first signals corresponding to ridges of a fingerprint and a plurality of second signals corresponding to valleys of the fingerprint; and
determining a pressure on the preset region according to a relationship between the first signals and the second signals,
wherein the computer program caused the processor to implement determining the pressure on the preset region according to the relationship between the first signals and the second signals further causes the processor to implement:
calculating a difference value between the first signals and the second signals; and
when the difference value is smaller than a preset difference value threshold, determining that the pressure on the preset region is higher than a preset pressure threshold; or
wherein the computer program caused the processor to implement determining the pressure on the preset region according to the relationship between the first signals and the second signals further causes the processor to implement:
calculating a first mean value of a maximum first signal and a minimum first signal of the plurality of first signals and a second mean value of a maximum second signal and a minimum second signal of the plurality of second signals; and
determining a first number of signals corresponding to the first mean value and a second number of signals corresponding to the second mean value, and
wherein, when the first number is larger than a first preset number and the second number is larger than a second preset number, it is determined that the pressure on the preset region is higher than the preset pressure threshold.

14. The non-transitory computer-readable storage medium of claim 13, wherein the computer program caused the processor to implement calculating the difference value between the first signals and the second signals further causes the processor to implement:
calculating a first difference value between a maximum first signal of the plurality of first signals and a maximum second signal of the plurality of second signals; and/or
calculating a second difference value between a minimum first signal of the plurality of first signals and a minimum second signal of the plurality of second signals,
wherein under the condition that the first difference value is smaller than a first preset difference value threshold, and/or the second difference value is smaller than a second preset difference value threshold, it is determined that the pressure on the preset region is higher than the preset pressure threshold.

15. The non-transitory computer-readable storage medium of claim 13, wherein the computer program caused the processor to implement calculating the difference value between the first signals and the second signals further causes the processor to implement:
calculating a third difference value between a mean value of first signals that are top-ranked in a first preset proportion of the plurality of first signals and a mean value of second signals that are top-ranked in the first preset proportion of the plurality of second signals; and/or
calculating a fourth difference value between a mean value of first signals that are bottom-ranked in a second preset proportion of the plurality of first signals and a mean value of second signals that are bottom-ranked in the second preset proportion of the plurality of second signals,
wherein, under the condition that the third difference value is smaller than a third preset difference value threshold, and/or the fourth difference value is smaller than a fourth preset difference value threshold, it is determined that the pressure on the preset region is higher than the preset pressure threshold.

16. The non-transitory computer-readable storage medium according to claim 13, wherein the computer program further causes the processor to implement:
under the condition that the pressure is higher than the preset pressure threshold, generating a fingerprint pattern according to the first signals and the second signals.

17. The non-transitory computer-readable storage medium of claim 16, wherein the computer program caused the processor to implement calculating the difference value between the first signals and the second signals further causes the processor to implement:
calculating a first difference value between a maximum first signal of the plurality of first signals and a maximum second signal of the plurality of second signals; and/or
calculating a second difference value between a minimum first signal of the plurality of first signals and a minimum second signal of the plurality of second signals,
wherein, under the condition that the first difference value is smaller than a first preset difference value threshold, and/or the second difference value is smaller than a second preset difference value threshold, it is determined that the pressure on the preset region is higher than the preset pressure threshold.

18. The non-transitory computer-readable storage medium of claim 16, wherein the computer program caused the processor to implement calculating the difference value between the first signals and the second signals further causes the processor to implement:

calculating a third difference value between a mean value of first signals that are top-ranked in a first preset proportion of the plurality of first signals and a mean value of second signals that are top-ranked in the first preset proportion of the plurality of second signals; and/or calculating a fourth difference value between a mean value of first signals that are bottom-ranked in a second preset proportion of the plurality of first signals and a mean value of second signals that are bottom-ranked in the second preset proportion of the plurality of second signals, wherein, under the condition that the third difference value is smaller than a third preset difference value threshold, and/or the fourth difference value is smaller than a fourth preset difference value threshold, it is determined that the pressure on the preset region is higher than the preset pressure threshold.

* * * * *